United States Patent Office 3,706,741
Patented Dec. 19, 1972

3,706,741
PROCESS FOR PREPARING 2,4,6-TRIS(TERT ALKYLAMINO)-s-TRIAZINES
Christos George Papaioannou, 7 Kingsbridge Road, Somerset, N.J. 08873
No Drawing. Filed Aug. 11, 1971, Ser. No. 170,955
Int. Cl. C07d 55/24
U.S. Cl. 260—249.6       5 Claims

ABSTRACT OF THE DISCLOSURE

This disclosure describes a method of preparing 2,4,6-tris(tertiary alkylamino or 1-adamantylamino)-s-triazines by trimerization of tertiary alkyl or 1-adamantyl cyanamides. The products of the process are useful as anti-mycobacterial agents.

Compounds prepared by the process of this invention are described and claimed by co-workers Cantrall et al. in application Ser. No. 827,031, filed May 22, 1969, now U.S. Pat. No. 3,591,693, and in U.S. Pat. 3,577,417.

SUMMARY OF THE INVENTION

This invention relates to a method of preparing trisubstituted melamines. More particularly, it relates to the preparation of 2,4,6-tris(tertiaryalkylamino or 1-adamantylamino)-s-triazines.

The compounds prepared by the present process may be illustrated by the following formula:

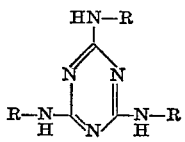

wherein R is tertiary alkyl ($C_4$ to $C_{12}$) or 1-adamantyl.

The above compounds are prepared by trimerization of tertiary alkyl or 1-adamantyl cyanamides. Trimerization of tertiary alkyl cyanamides to 2,4,6-tris(tertiaryalkylamino)-s-triazines with a strong alkali catalyst does not produce good results.

It has now been found that trimerization of tertiary alkyl or 1-adamantyl cyanamides to 2,4,6-tris(tertiary alkylamino or 1-adamantylamino)-s-triazines proceeds readily in the presence of halogen acids such as hydrogen chloride or hydrogen bromide to produce good yields. In view of the teaching of the Kaiser et al. patent which stresses the need for a strong alkali catalyst to effect the trimerization, it is surprising and unexpected to discover that the reaction occurs in the presence of a halogen acid.

The process is preferably carried out by mixing a tertiary alkyl or 1-adamantyl cyanamide with an inert non-hydroxylic organic solvent and treating with an excess of gaseous hydrogen chloride or hydrogen bromide and heating for a period of time to effect the trimerization.

The tertiary alkyl or 1-adamantyl cyanamides useful in the present invention include, for example, tertiary butyl cyanamid, tertiary amyl cyanamide, tertiary hexyl cyanamide, tertiary heptyl cyanamide, tertiary octyl cyanamide, tertiary decyl cyanamide, tertiary dodecyl cyanamide, 1-adamantyl cyanamide and the like. The tertiary alkyl cyanamides are readily prepared by reacting tertiary alkylamines with cyanogen chloride in cold aqueous alkaline solution as described by Erichs et al. U.S. Pat. 2,331,670.

Compounds within the scope of the present invention may be, for example, 2,4,6-tris(tert butylamino)-s-triazine;
2,4,6-tris(tertamylamino)-s-triazine;
2,4,6-tris(tert hexylamino)-s-triazine;
2,4,6-tris(tert heptylamino)-s-triazine;
2,4,6-tris(tert octylamino)-s-triazine;
2,4,6-tris(tert decylamino)-s-triazine;
2,4,6-tris(tert dodecylamino)-s-triazine;
2,4,6-tris(1-adamantylamino)-s-triazine, etc.

It has been found that gaseous hydrogen chloride or hydrogen bromide are the most useful catalysts. Other strong acids, such as hydrogen fluoride, sulfuric acid or toluene sulfonic acid are not effective. Best results are obtained if the acid catalyst is used at a molar ratio of 0.5 to 2.0 with respect to the tertiary alkyl cyanamides or 1-adamantyl cyanamide, but higher molar ratios may be used, if desired.

The inert non-hydroxylic organic solvent may be, for example, benzene, toluene, xylene, o-dichlorobenzene, dimethylformamide, etc. The reaction is carried out by mixing the reactants at a temperature of from 15° to 35° C. followed by heating to a temperature of from about 75° to 200° C. for from about 15 minutes to 12 hours. The product can be obtained from the reaction mixture and purified by methods well known to those skilled in the art.

The 2,4,6-tris(tertiaryalkylamino or 1-adamantylamino)-s-triazines of the present invention are active against *Mycobacterium tuberculosis* H37Rv infections in mice when tested in accordance with the following procedure. Carworth Farms CF1 white mice, females, 4 to 6 weeks old, weighing 17 to 22 grams, are infected with *Mycobacterium tuberculosis* H37Rv by administration intravenously of 0.2 ml. of a buffered saline suspension containing approximately 1.5 mg. per ml. wet weight of a 12 to 14 day culture of the test organism grown on Sauton's agar medium. Routinely, 200–300 mice are given this standard infection and then segregated in a random manner into cages each of which holds five or ten mice. Four groups of five mice each are retained as untreated controls, and the remaining mice are used to ascertain activity of compounds under test. During a one year experience with this test, the standard infection defined above caused a 99.5% mortality, in that 756 of the 760 infected untreated control mice died within 28 days, the normal period of the test.

A measured amount of each compound to be tested is administered orally incorporated in a Standard Diet to groups of infected mice for 14 days, after which the mice are fed untreated Standard Diet. Control animals receive untreated Standard Diet for the entire test period and all animals are allowed to feed at will. Tests are terminated 28 days after the day of infection. A compound is judged active if it either saves 2 or more of the 5 mice in a test group in two tests or prolongs average survival time by 4 or more days compared to untreated controls.

The Standard Diet used in this test procedure is a commercial feed designed for laboratory mice and rats composed of the following ingredients: Animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers' dried yeast, irradiated dried yeast (source of vitamin $D_2$), riboflavin, niacin, calcium pantothenate, chlorine chloride, vitamin A palmitate, D-activated animal sterol, α-tocopherol, dicalcium phosphate, thiamine hydrochloride, menadione sodium bisulfite( source of Vitamin K activity), salt and traces of: manganous oxide, copper, sulfate, iron carbonate, potassium iodate, cobalt sulfate, and zinc oxide. The said commercial feed has the guaranteed analysis as containing a minimum of 24.0% crude protein, a miinmum of 4.0% crude fat and a maximum of 4.5% crude fiber and is sold under the trade mark Wayne Lab-Blox® by Allied Mills, Inc., Chicago, Ill. In the test procedure described hereinabove, the Standard Diet into which measured amounts of the test compounds had been homogeneously incorporated was administered to infect test animals, whereas untreated Standard Diet was given to infected control animals.

In a representative operation, and merely by way of illustration, the following compounds of the present invention are active in this test procedure at the indicated oral dose as set forth in the table below:

TABLE

| Compound | Percent compound in diet | Alive/total mice tested 28 days after infection |
|---|---|---|
| 2,4,6-tris(1-adamantyl amino)-s-triazine | 0.4 | 5/5 |
|  | 0.1 | 5/5 |
|  | 0.025 | 5/5 |
|  | 0.006 | 2/5 |
| ,4,6-tris(tert.-butylamino)-s-triazine | 0.1 | 5/5 |
|  | 0.5 | 5/5 |
| 2,4,6-tris(tert.-pentylamino)-s-triazine | 0.4 | 5/5 |
|  | 0.1 | 4/5 |
|  | 0.2 | 5/5 |
|  | 0.05 | 5/5 |

NOTE.—Infected, non-treated controls: 100/100 mice died with an average survival time of 19 days.

DETAILED DESCRIPTION OF THE INVENTION

The following examples illustrate in detail the process of preparing representative compounds of this invention.

EXAMPLE 1

Preparation of 2,4,6-tris(2,3,3-trimethyl-2-butylamino)-s-triazine

A solution of 2,3,3-trimethyl-2-butylcyanamide (7.0 g., 0.05 mole) in 56 ml. toluene is cooled and stirred as gaseous hydrogen chloride is bubbled in for a period of about 10 minutes. The solution is then refluxed for 2 hours, cooled to room temperature, filtered and the filtrate evaporated to ½ volume. There is obtained 2.16 g. 2,4,6-tris(2,3,3-trimethyl-2-butylamino)-s-triazine hydrochloride, melting point 246–48° C. (dec.), identified by comparison with the infrared spectrum of an authentic sample.

The filtrate is evaporated to dryness and the residue washed with ether and then dissolved in acetone, filtered and the acetone solution evaporated to dryness. The residue is dissolved in 3 ml. methanol and 1 ml. 28% ammonium hydroxide added. The precipitated 2,4,6-tris(2,3,3-trimethyl-2-butylamino)-s-triazine is filtered, washed with water and dried; wt. 0.36 g. Total yield of product was 46% of theory.

EXAMPLE 2

Preparation of 2,4,6-tris(2,3,3-trimethyl-2-buylamino)-s-triazine

A solution of gaseous hydrogen bromide (1.82 g., 0.0225 mole), 2,3,3-trimethyl-2-butylcyanamide (2.8 g., 0.02 mole) and 34 g. of toluene is refluxed for 1.5 hours.

The reaction mixture is cooled to room temperature, filtered and washed with toluene. The filtrate is evaporated to dryness and the residue dissolved in ether and washed with 28% ammonium hydroxide. The ether is evaporated leaving 0.4 g. 2,4,6-tris(2,3,3-trimethyl-2-butylamino)-s-triazine.

EXAMPLE 3

Preparation of 2,4,6-tris(1-adamantylamino)-s-triazine

A mixture of 1-adamantylcyanamide (2.64 g., 0.015 mole) and 50 ml. toluene at room temperature is stirred as hydrogen chloride is bubbled in. The exothermic reaction produces a white slurry; this is heated at reflux for two hours with hydrogen chloride bubbling through the mixture, and then for 4–5 hours without hydrogen chloride. The mixture is then cooled to room temperature and filtered. On standing the filtrate affords a precipitate which is washed with toluene and dried. It is identified as 2,4,6-tris(1-adamantylamino)-s-triazine hydrochloride by comparison of the infrared spectrum and thin layer chromatogram with an authentic sample. Total yield 1.1 gram, 38.8%.

What is claimed is:

1. A method for the preparation of 2,4,6-tris(tertiary alkylamino)-s-triazines of the formula:

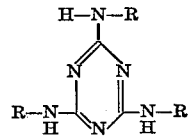

wherein R is tertiaryalkyl ($C_4$–$C_{12}$) or 1-adamantyl which comprises contacting a tertiary alkyl ($C_4$–$C_{12}$) cyanamide or 1-adamantyl cyanamide in an inert non-hydroxylic organic solvent with gaseous hydrogen chloride or hydrogen bromide, subsequently heating the reaction mixture and recovering said compound therefrom.

2. A method according to claim 1, wherein the reaction mixture is heated to a temperature of from about 75° to 200° C.

3. A method according to claim 1, wherein the inert non-hydroxylic organic solvent is toluene.

4. A method according to claim 1, wherein the tertiary-alkyl cyanamide is 2,3,3-trimethyl-2-butylcyanamide.

5. A method according to claim 1, wherein the cyanamide is 1-adamantyl cyanamide.

References Cited

UNITED STATES PATENTS 2,206,005   6/1940   Grim _____ 260—249.7
3,577,417   5/1971   Cantrall et al. _____ 260—249.6

JOHN M. FORD, Primary Examiner

U.S. Cl. X.R.

424—249

UNITED STATES PATENT OFFICE
CERTIFICATE OF CORRECTION

Patent No. 3,706,741       Dated December 19, 1972

Inventor(s) Christos George Papaioannou

It is certified that error appears in the above-identified patent and that said Letters Patent are hereby corrected as shown below:

Page 1, Column 1, after inventor's address please insert -- Assignor to American Cyanamid Company, Stamford, Connecticut --.

Signed and sealed this 12th day of June 1973.

(SEAL)
Attest:

EDWARD M. FLETCHER, JR.
Attesting Officer

ROBERT GOTTSCHALK
Commissioner of Patents